(12) United States Patent
Ono et al.

(10) Patent No.: US 7,440,001 B2
(45) Date of Patent: Oct. 21, 2008

(54) OPTICAL WRITING DEVICE AND IMAGE FORMING APPARATUS

(75) Inventors: Rumiko Ono, Tokyo (JP); Takeshi Yamakawa, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 1022 days.

(21) Appl. No.: 10/859,152

(22) Filed: Jun. 3, 2004

(65) Prior Publication Data

US 2005/0012974 A1 Jan. 20, 2005

(30) Foreign Application Priority Data

Jun. 3, 2003 (JP) .............................. 2003-158516

(51) Int. Cl.
*G02B 26/12* (2006.01)

(52) U.S. Cl. .................. 347/257; 347/242; 347/245; 359/216

(58) Field of Classification Search ......... 347/257–261, 347/263, 241, 242, 243, 245; 359/216
See application file for complete search history.

(56) References Cited

U.S. PATENT DOCUMENTS

| 4,996,561 A | 2/1991 | Yoshimura et al. |
| 5,019,867 A | 5/1991 | Yamakawa et al. |
| 5,382,129 A | 1/1995 | Shimizu et al. |
| 5,438,447 A * | 8/1995 | Kunii .......................... 359/200 |
| 5,587,813 A | 12/1996 | Yamazaki et al. |
| 5,598,279 A | 1/1997 | Ishii et al. |
| 5,610,651 A | 3/1997 | Yamakawa et al. |
| 5,803,622 A | 9/1998 | Mama et al. |
| 6,072,516 A | 6/2000 | Yamakawa |
| 6,172,786 B1 * | 1/2001 | Fujita et al. .................. 359/200 |
| 6,236,418 B1 | 5/2001 | Yamakawa |
| 6,243,128 B1 | 6/2001 | Yamakawa |
| 6,560,433 B1 | 5/2003 | Yamakama |
| 6,741,823 B2 | 5/2004 | Yamakama |
| 2003/0160860 A1 | 8/2003 | Yamakawa |
| 2004/0105079 A1 | 6/2004 | Yamakawa et al. |
| 2006/0250674 A1 * | 11/2006 | Akiyama ..................... 359/206 |

FOREIGN PATENT DOCUMENTS

| JP | 9-236772 | 9/1997 |
| JP | 2000-338439 | 12/2000 |
| JP | 2002-250889 | 9/2002 |

OTHER PUBLICATIONS

U.S. Appl. No. 09/015,336, filed Jan. 29, 1998.
U.S. Appl. No. 07/729,850, filed Jul. 11, 1991.
U.S. Appl. No. 07/284,359, filed Dec. 14, 1988.
U.S. Appl. No. 07/825,575, filed Jan. 24, 1992.
U.S. Appl. No. 10/859,152, filed Jun. 3, 2004, Ono.

* cited by examiner

*Primary Examiner*—Huan H Tran
(74) *Attorney, Agent, or Firm*—Oblon, Spivak, McClelland, Maier & Neustadt, P.C.

(57) ABSTRACT

An optical writing device includes a polygon mirror configured to guide a light beam emitted from a light source. The polygon mirror is disposed in a case. The case includes a cover unit and a pressure unit configured to exert pressure on the cover unit. Pressure exerted by the pressure unit on the cover unit is greater than pressure exerted on another portion of the cover unit.

32 Claims, 6 Drawing Sheets

OPTICAL WRITING DEVICE AND IMAGE FORMING APPARATUS

CROSS-REFERENCE TO RELATED APPLICATION

The present application claims priority to Japanese application no. 2003-158516, filed in the Japanese Patent Office on Jun. 3, 2003, the disclosure of which is incorporated by reference herein in its entirety.

BACKGROUND OF THE INVENTION

1. Field of the Invention

The present invention relates to an optical writing device and an image forming apparatus.

2. Description of the Background Art

It is known to use a laser writing device in an image forming apparatus such as a laser printer, a digital copying machine, a digital facsimile machine, and a multifunction machine. In a known laser writing device, a roller bearing for a polygon mirror is placed directly on a driving base plate. The polygon mirror rotates on the base plate, which is not surrounded by a barrier, such as a wall or a case. In another known laser writing device, the polygon mirror rotates within a case. The laser writing device that is not surrounded by the barrier is used only for limited applications in which the polygon mirror rotates at a relatively low speed. Because rotation of the polygon mirror at a relatively high speed is preferred, the laser writing device within the case is frequently used. Generally, the case is almost fully enclosed around the polygon mirror, such that noise caused by rotation of the polygon mirror is reduced or suppressed In such a laser writing device, the case includes a housing which surrounds the polygon mirror and a cover disposed on an open top of the housing. Such an arrangement can be easily assembled. The cover is in the shape of a flat plate, and the cover is connected to the housing with bolts inserted through a peripheral portion of the cover into the housing. However, considerable noise is produced in the conventional case because of sympathetic vibration (resonance) or forced vibration, as well as other vibrations caused by a variety of factors. The factor includes air movement caused by rotation of the polygon mirror, and misalignment of a body of rotation such as the polygon mirror, among other factors. Accordingly, the known laser writing device including the housing and cover cannot effectively decrease noise and vibration.

SUMMARY OF THE INVENTION

An object of the present invention can include providing an optical writing device producing a relatively low level of noise.

Another object of the present invention can include providing an optical writing device producing a relatively low level of vibration.

Another object of the present invention can include providing an information recording apparatus in which a relatively low level of noise is produced from operation of the optical writing device.

In order to achieve these and other advantages, the present invention provides an optical writing device. A polygon mirror is configured to guide a light beam emitted from a light source. The polygon mirror is disposed in the case. The case includes a cover unit and a pressure unit configured to exert pressure on the cover unit. Pressure exerted by the pressure unit on the cover unit is greater than pressure exerted on another portion of the cover unit.

The present invention further provides another embodiment of an optical writing device including a case having a housing surrounding the polygon mirror, and a covering unit disposed on the housing, the covering unit including a first cover and a second cover including a protrusion. The second cover is disposed on the first cover such that pressure is exerted by the protrusion on the first cover.

The present invention still further provides another embodiment of an optical writing device including a case having a housing surrounding the polygon mirror, and a covering unit disposed on the housing, the covering unit including a first cover and a second cover having a curved shape. The second cover is disposed on the first cover such that pressure is exerted by the curved shape on the first cover.

The present invention still further provides another embodiment of an optical writing device including a case having a housing surrounding the polygon mirror, and a covering unit disposed on the housing, the covering unit including first and second covers and a pinched member. The pinched member is disposed between the first and second covers such that pressure is exerted on the first cover.

The present invention still further provides another embodiment of an optical writing device including means for guiding a light beam emitted from a light source, and a case in which the means for guiding is disposed. The case includes means for covering an opening of a housing surrounding the means for guiding, and means for exerting pressure on the means for covering. Pressure exerted by the means for exerting pressure is greater than pressure exerted on another portion of the means for covering.

The present invention still further provides a method of suppressing noise in an image forming apparatus, including disposing a first cover on a housing in which a polygon mirror is disposed, and exerting a greater pressure against a middle portion of the first cover to retain the first cover on the housing than at another portion of the first cover.

The present invention still further provides an image forming apparatus including an image forming device having a photoconductor, and an optical writing device.

Other objects and further features of the present invention will be apparent from the following detailed description when read in conjunction with the accompanying drawings.

BRIEF DESCRIPTION OF THE DRAWING

A more complete appreciation of the present invention, and many of the attendant advantages thereof, will be readily ascertained and/or obtained as the same becomes better understood by reference to the following detailed description when considered in connection with the accompanying drawings, wherein.

DETAILED DESCRIPTION

Examples of one or more embodiments of the present invention are now described with reference to the drawings, wherein like reference numbers throughout the figures identify like and/or similar elements.

Figure 1:
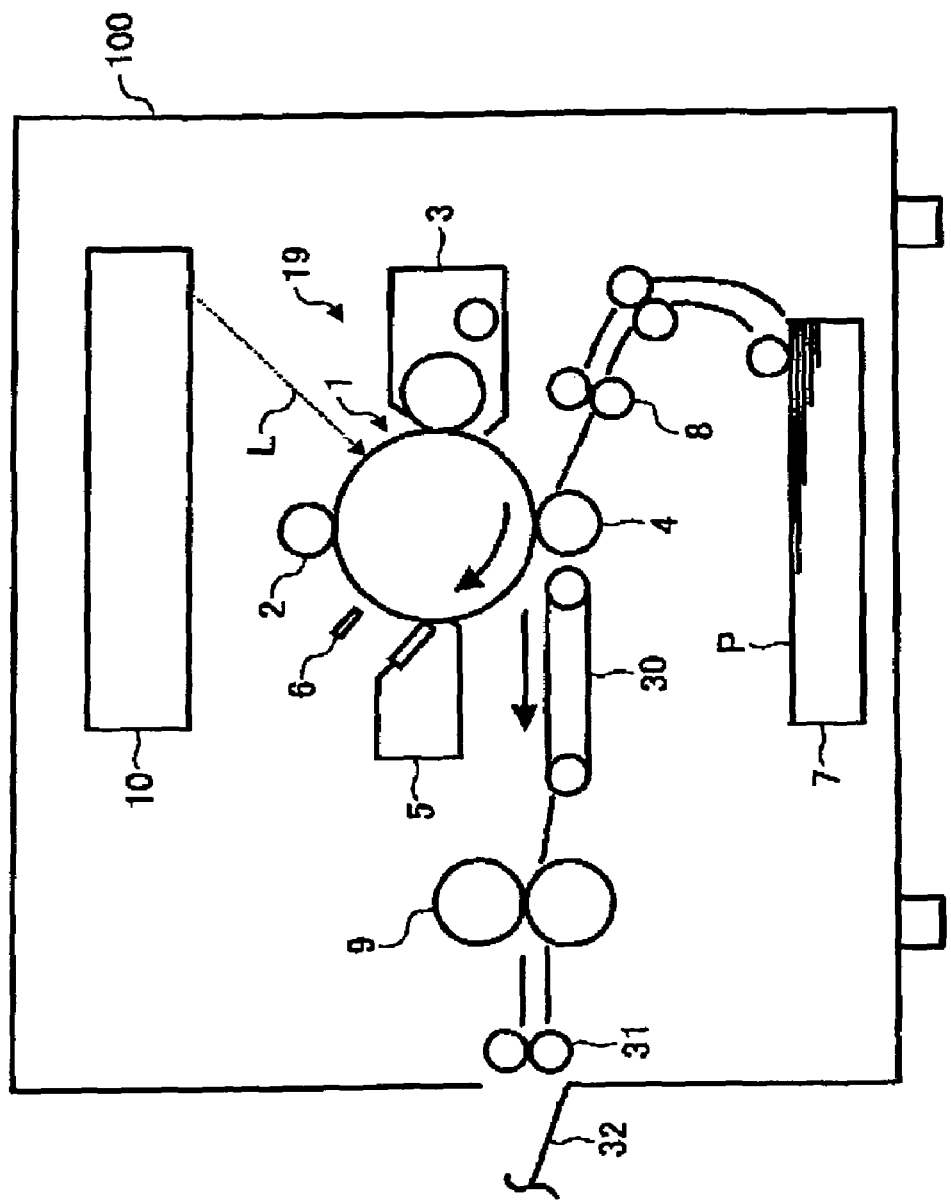
FIG. 1 shows a side elevation view of an image forming apparatus including a laser writing device.

FIG. 1 shows a side elevation view of an image forming apparatus including a optical writing device, such as a laser writing device. As shown in FIG. 1, in a preferred embodiment of the invention the image forming apparatus includes a laser printer 100.

The printer 100 includes an image forming device 19 having a photoconductor drum 1. In the example shown in FIG. 1, the photoconductor drum 1 is driven to rotate in a clockwise direction. A charging roller 2 uniformly charges a surface of the photoconductor drum 1. A laser writing device 10, which emits a laser beam L with an optical modulation, exposes the surface of the photoconductor drum 1 to form a latent image thereon. A developing device 3 deposits a toner on the surface of the photoconductor drum 1 to form a visible toner image on the photoconductor drum surface.

A sheet feeding device 7, which is disposed in a lower portion of the printer 100 of FIG. 1, feeds a recording medium P (e.g., a transfer sheet) through registration rollers 8 to a position between the photoconductor drum 1 and a transfer roller 4. A voltage is applied to the transfer roller 4 which is opposite to the charge of the toner on the photoconductor drum 1. The toner image is transferred from the photoconductor drum 1 to the recording medium P. A cleaning device 5 removes a residual toner remaining on the surface of the photoconductor drum 1 which has not been transferred to the recording medium P. A neutralization device 6 neutralizes the charge on the surface of the photoconductor drum 1.

A conveying belt 30 conveys the recording medium P including the toner image to a fixing device 9, which fixes the toner image on the recording medium P. Discharging rollers 31 discharge the recording medium P including the fixed toner image on to the discharged sheet tray 32.

Figure 2:
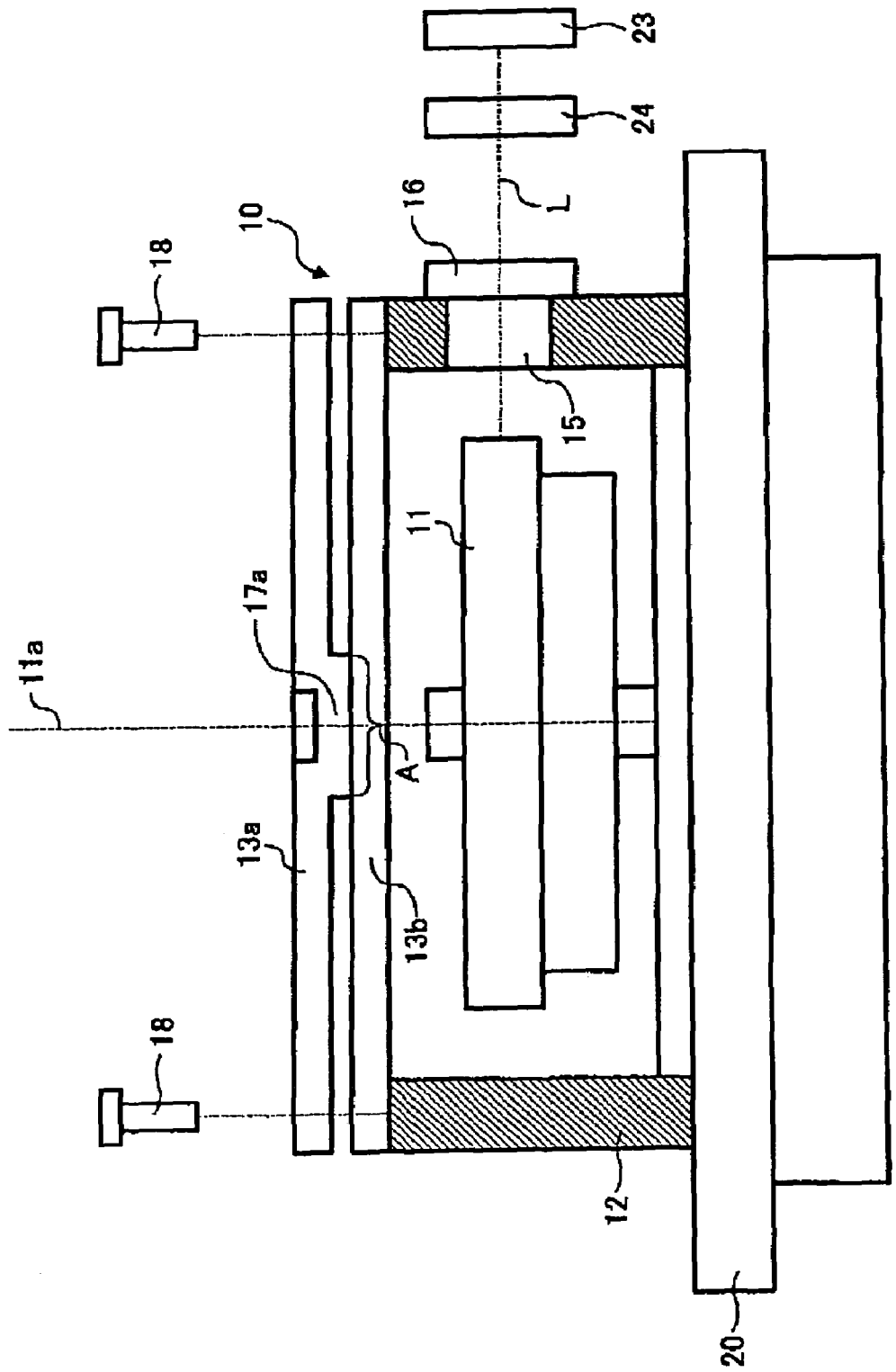
FIG. 2 is a cross-sectional view showing a portion of the laser writing device according to an embodiment of the invention.

FIG. 2 is a cross-sectional view showing a portion of the laser writing device 10 according to an embodiment of the invention. The laser writing device 10 is an enclosed laser writing device, in which a polygon mirror 11 is disposed in an enclosed space 14 formed by a case including an optics housing 12, an upper cover 13a, a lower cover 13b, and a base plate 20. The case can suppress noise produced by rotation of the polygon mirror 11. The optics housing 12 defines an opening 15 through which the laser beam L is received on and reflected from the polygon mirror 11. A soundproof glass is disposed to cover the opening 15. A light source 23 emits the laser beam L through an optical system 24 onto the polygon mirror 11. The polygon mirror 11 reflects the laser beam L, as a result of the rotation of the polygon mirror 11, to thereby scan the surface of the photoconductor drum 1.

It is noted that if the laser writing device 10 includes the lower cover 13b but does not include, for example, the optics housing 12, the upper cover 13a, and the base plate 20, noise occurs as a result of a sympathetic or forced vibration of the lower cover 13b when the polygon mirror 11 is rotated around a rotation axis 11a. The sympathetic vibration results from air movement caused by the rotation of the polygon mirror 11, and/or misalignment of the polygon mirror 11, among other factors. It is also noted that the sympathetic vibration frequently occurs when the polygon mirror 11 has a hexagonal outer shape.

As shown in FIG. 2, the laser writing device 10 includes the upper cover 13a in addition to the lower cover 13b. The upper cover 13a and the lower cover 13b are overlapped with respect to one another, and a pressure part A is disposed on at least a portion the overlapped portions of the upper cover 13a and the lower cover 13b. Pressure exerted between the upper cover 13a and the lower cover 13b is greater at the pressure part A than at the other portions of the overlapped portions. In the embodiment shown in FIG. 2, the pressure part A is formed by a protrusion 17a on a central portion of the upper cover 13a and by disposing the upper cover 13a on the lower cover 13b and the optics housing 12 such that the protrusion 17a exerts pressure on the lower cover 13b. In this case, the upper cover 13a and lower cover 13b are connected to the optics housing 12 by fastening the upper cover 13a, lower cover 13b, and optics housing 12 with one or more bolts 18 at peripheral portions of the upper and lower covers 13a and 13b. In this embodiment, pressure is exerted between the upper cover 13a and the lower cover 13b in the central portions of the upper cover 13a and lower cover 13b. Thus, the upper cover 13a, the lower cover 13b, and protrusion 17a serve as the pressure unit A and the covering unit A central axis of the pressure part A is aligned with a central axes of the upper cover 13a and the lower cover 13b and the rotation axis 11a of the polygon mirror 11. In a preferred embodiment of the invention, the pressure part A is disposed in a position that includes the central axis of at least one of the upper cover 13a and the lower cover 13b. In a more preferred embodiment, the pressure part A is disposed in a position that includes the central axis of both the upper cover 13a and the lower cover 13b, and still more preferably the pressure part A is disposed in a position that includes the rotation axis 1 a of the polygon mirror 11. Pressure exerted between the upper cover 13a and the lower cover 13b in the pressure part A is preferably not less than 1N, and an area of the pressure part A is preferably not more than 25 percent of the area of the lower cover 13b.

An eigen frequency in the central portion of the upper cover 13a and lower cover 13b, which is disposed away from the bolts 18, is increased because of the pressure part A. Accordingly, a proof characteristic to the vibration of the upper cover 13a and lower cover 13b is improved. Thus, the sympathetic vibration and noise resulting from air movement caused by the rotation of the polygon mirror 11, misalignment of the polygon mirror 11, and other factors, is decreased in the laser writing device 10. In addition the laser writing device 10 has a simple design. Thus, the laser writing device 10 can be manufactured by a process including providing the protrusion 17a on the upper cover 13a and attaching the upper cover 13a to the lower cover 13b and the optics housing 12 while exerting pressure on the lower cover 13b.

Figure 3:
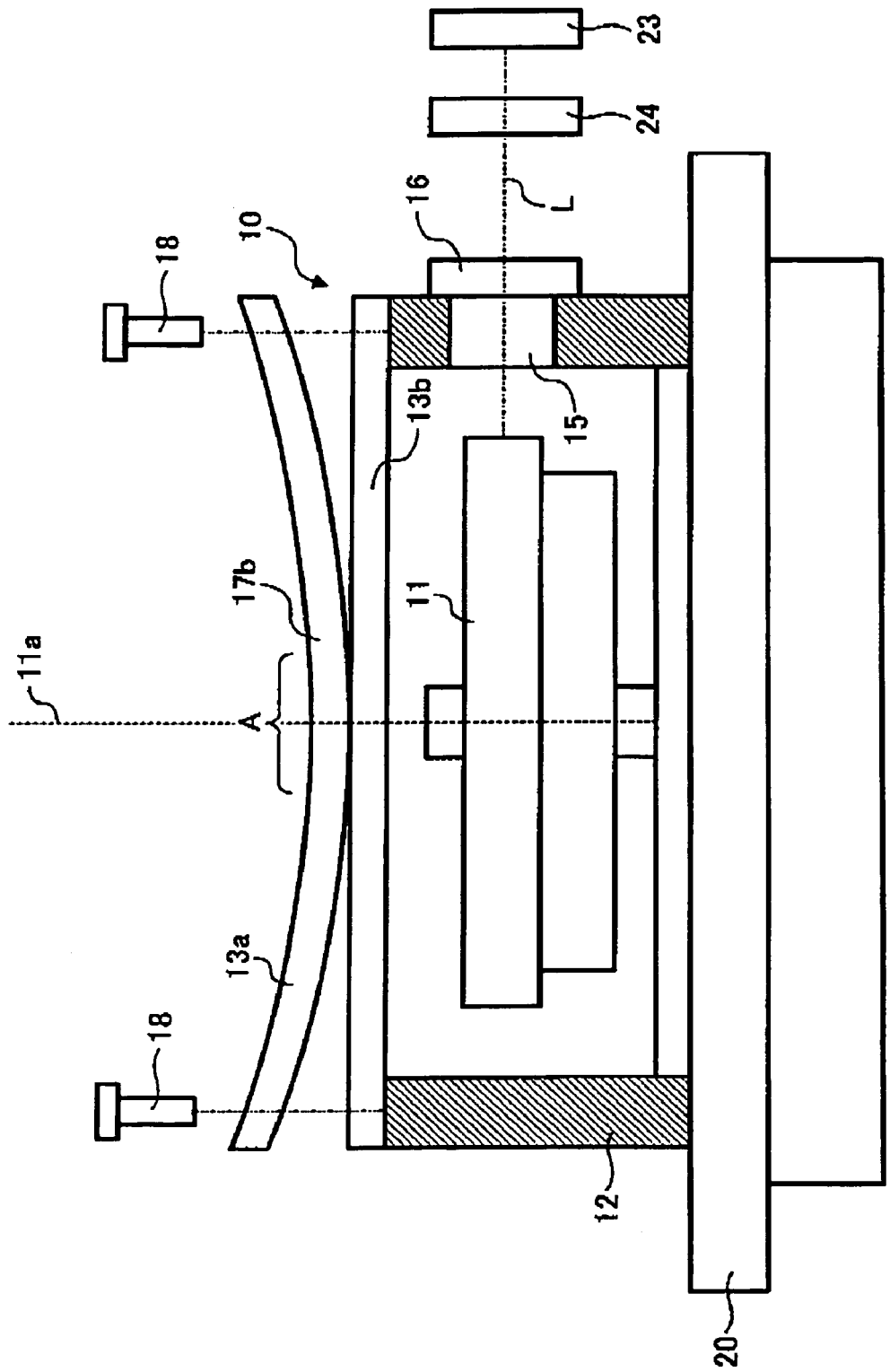
FIG. 3 is a cross-sectional view showing a portion of the laser writing device according to another embodiment of the invention.

FIG. 3 is a cross-sectional view showing a portion of the laser writing device 10 according to another embodiment of the invention. As shown in FIG. 3, the upper cover 13a has a curved shape including a top part 17b (a convex portion) disposed in the central portion of the upper cover 13a. The upper cover 13a is disposed such as the top part 17b of the upper cover 13a (the convex portion) faces and contacts the lower cover 13b.

The upper cover 13a is disposed on the lower cover 13b, which has a planar shape, and the optics housing 12, such that the top part 17b of the upper cover 13a exerts pressure between the upper cover 13a the lower cover 13b. The upper cover 13a and lower cover 13b are connected to the optics housing 12 by fastening the upper cover 13a, lower cover 13b, and optics housing 12 with one or more of the bolts 18 at the peripheral portions of the upper and lower covers 13a and 13b. The pressure part A is formed by the upper cover 13a including the top part 17b in the central portion of the upper cover 13a. The upper cover 13a having the curved shape and the lower cover 13b also serve as the covering unit. In addition, the central axis of the pressure part A is disposed on the central axes of the upper cover 13a and the lower cover 13b and the rotation axis 11a of the polygon mirror 11.

The eigen frequency in the central portion of the upper cover 13a and lower cover 13b is increased because of the pressure part A. Accordingly, the proof characteristic to the vibration of the upper cover 13a and lower cover 13b is improved. Thus, the sympathetic vibration and noise resulting from air movement caused by the rotation of the polygon mirror 11, misalignment of the polygon mirror 11, and other factors, is decreased in the laser writing device 10. In addition, the lower cover 13b, which has a planar shape, is disposed closer to the optics housing 12 than the upper cover 13a. Accordingly, the enclosed space 14 can be more securely enclosed, and noise caused by air movement resulting from rotation of the polygon mirror 11 and by the driving device can be suppressed more effectively.

Figure 4:
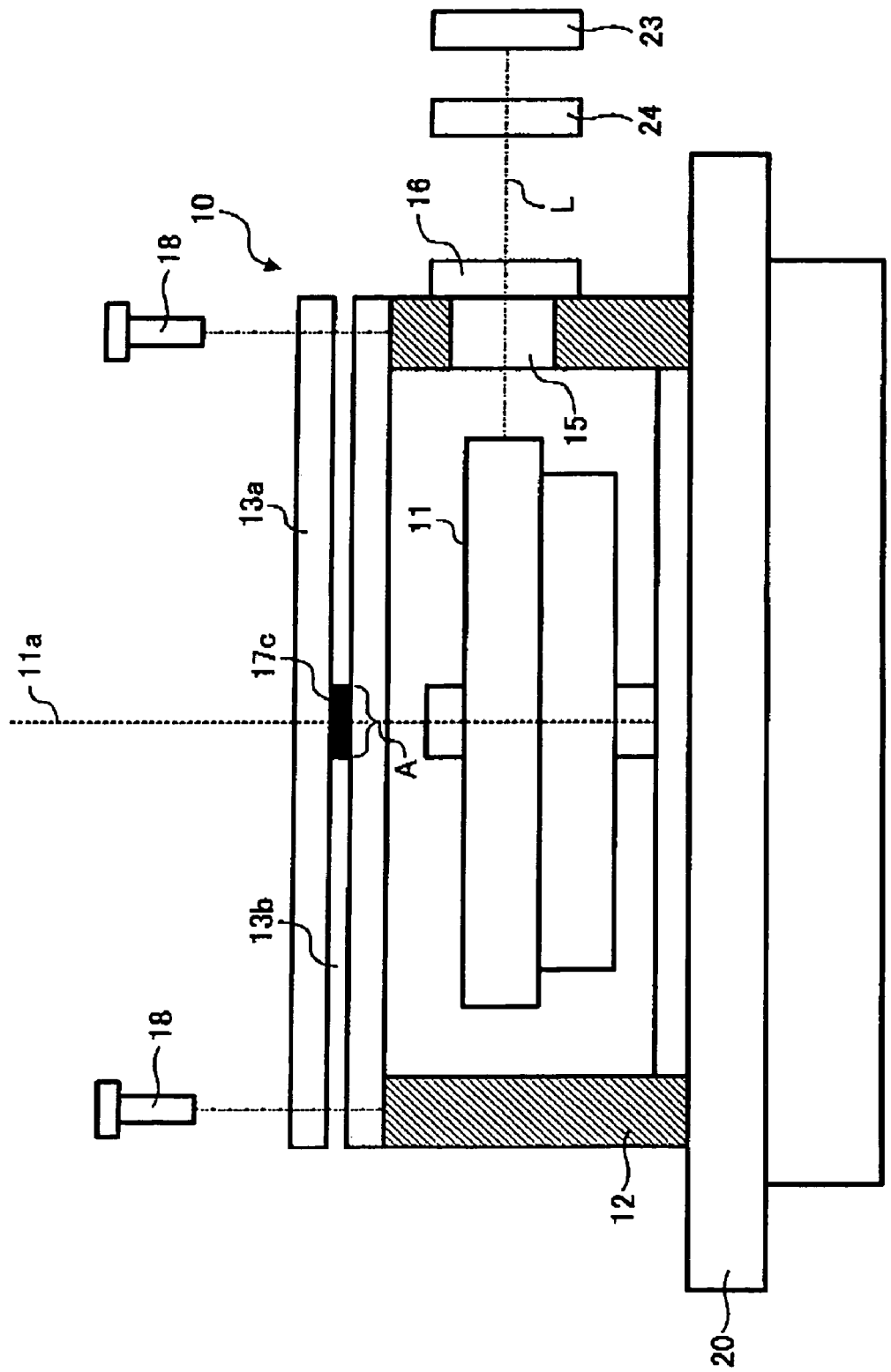
FIG. 4 is a cross-sectional view showing a portion of the laser writing device according to another embodiment of the invention.

FIG. 4 is a cross-sectional view showing a portion of the laser writing device 10 according to another embodiment of the invention. As shown in FIG. 4, a pinched member 17c is disposed and held between the upper cover 13a and the lower cover 13b, which have planar shapes. The pinched member 17c is disposed at the central portion of the upper cover 13a and lower cover 13b. In a preferred embodiment of the invention, the pinched member 17c is made from a relatively incompressible material, such as a metal and/or hard plastic, which is not deformed by pressure exerted by the upper and lower covers 13a and 13b.

The upper cover 13a is disposed on the lower cover 13b and the optics housing 12, such that the pinched member 17c exerts pressure between the upper cover 13a and the lower cover 13b. The upper cover 13a and lower cover 13b are connected to the optics housing 12 by fastening the upper cover 13a, lower cover 13b, and optics housing 12 with one or more of the bolts 18 at peripheral portions of the upper and lower covers 13a and 13b. Thus, the pressure part A is formed by the pinched member 17c. In addition, the central axis of the pressure part A is disposed on the central axes of the upper cover 13a and the lower cover 13b and the rotation axis 11a of the polygon mirror 11. The upper cover 13a, the lower cover 13b, and the pinched member 17c serve as the pressure unit and the covering unit.

The eigen frequency in the central portion of the upper cover 13a and lower cover 13b, which is disposed away from the bolts 18, is increased because of the pressure part A. Accordingly, the proof characteristic to the vibration of the upper cover 13a and lower cover 13b is improved. Thus, sympathetic vibration and noise resulting from air movement caused by the rotation of the polygon mirror 11, misalignment of the polygon mirror 11, and other factors, is decreased in the laser writing device 10. In addition the laser writing device 10 has a simple design, as the upper cover 13a and the lower cover 13b have a similar, planar shape, which do not include a protrusion or curve, and therefore the upper and lower covers 13a and 13b can be interchanged.

In a preferred embodiment of the invention, the upper cover 13a and lower cover 13b can be manufactured from materials including metals such as iron, aluminum and copper, and/or plastics. In a more preferred embodiment, a metal having a higher thermal conductivity is used, thereby allowing release of heat accumulated in the almost enclosed space 14. In a preferred embodiment, the upper cover 13a and lower cover 13b can be manufactured from a material permitting elastic deformation. Pressure exerted between the upper cover 13a and the lower cover 13b in the pressure part A can be determined by selecting the cover material, and/or by a thickness of the protrusion 17a or the pinched member 17c, and/or an amount of curvature of the upper cover 13a.

In a preferred embodiment of the invention, noise insulating or suppressing properties of the upper cover 13a and the lower cover 13b are different from one other. In order to differentiate the noise insulation properties, different material are preferably used for the upper cover 13a and the lower cover 13b. By differentiating the noise insulating properties of the covers, noises having various frequencies can be more effectively decreased.

Figure 5:
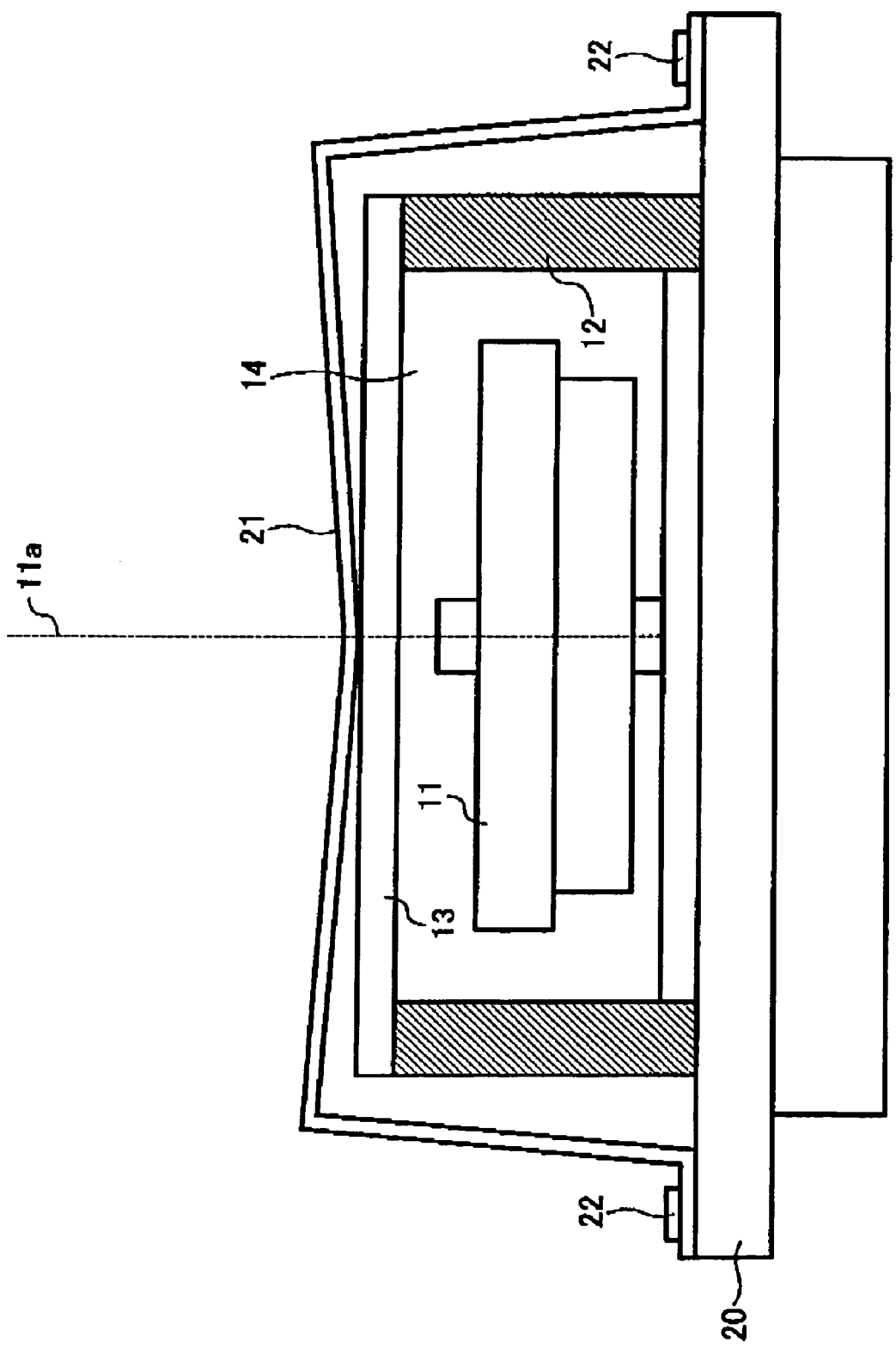
FIG. 5 is a cross-sectional view showing a portion of the laser writing device according to another embodiment of the invention.
Figure 6:
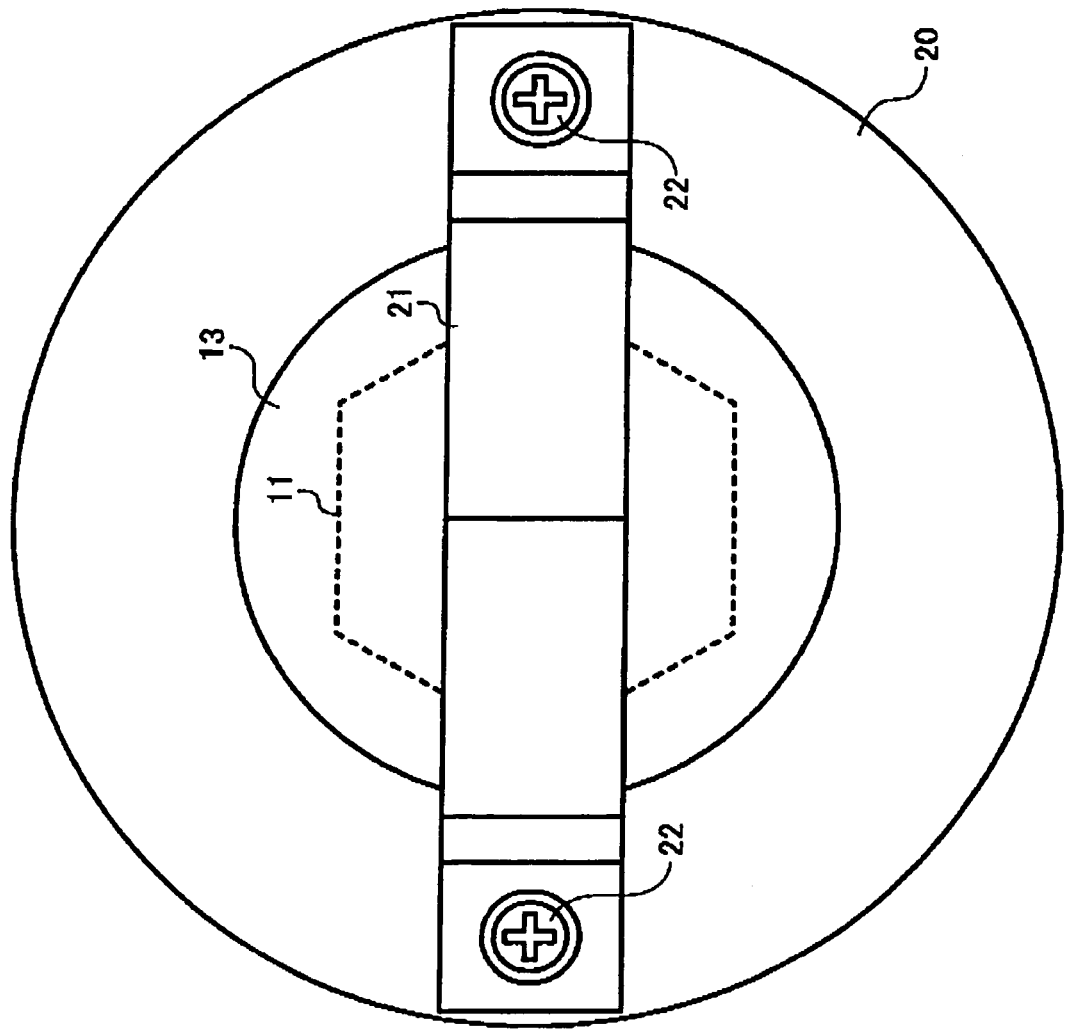
FIG. 6 is a top view of the laser writing device shown in FIG. 5

FIG. 5 is a cross-sectional view showing a portion of the laser writing device 10 according to another embodiment of the invention. FIG. 6 is a top view of the laser writing device shown in FIG. 5. As shown in FIGS. 5 and 6, a blade spring 21 exerts pressure on the cover 13 to retain the cover 13 on the optics housing 12. Screws 22 connect the blade spring 21 to a base plat 20. Thus, the pressure part A is formed by the blade spring 21. In addition, the central axis of the pressure part A is disposed on the central axis of the cover 13 and the rotation axis 11a of the polygon mirror 11. Pressure exerted on the cover 13 by the pressure part A can be determined by adjusting a characteristic of the blade spring 21. The optics housing 12 and the cover 13 serve as the case. The cover 13 serves as the covering unit, and the blade spring 21 serves as the pressure unit A. The cover 13 can be connected to the optics housing 12 with bolts at peripheral portions of the cover 13.

Thus, the present invention can provide an optical writing device producing a relatively low level of noise, and can provide an information recording apparatus that includes the optical writing device producing the low noise level.

It is to be understood that the present invention is not limited to the above described embodiments. Numerous variations and modification may be made without departing from the scope of the present invention.

For example, though one or two covers are provided in the embodiments shown in the figures, three or more covers can be used. Also, a polygon mirror having a greater thickness in the direction of the rotating axis and/or a plurality of polygon mirror placed on a same rotating axis to write latent images to a plurality of photoconductor (four photoconductors, for example), can be used. The lower cover 13b and/or the cover 13 can be integrated with optics housing 12.

The invention claimed is:

1. An optical writing device comprising:
 a polygon mirror configured to guide a light beam emitted from a light source; and
 a case in which the polygon mirror is disposed, the case comprising a cover unit and a pressure unit configured to exert pressure on the cover unit,
 wherein pressure exerted by the pressure unit on the cover unit is greater than pressure exerted on another portion of the cover unit.

2. The optical writing device according to claim 1, wherein the case comprises a housing surrounding the polygon mirror, and the cover unit is disposed on the housing.

3. The optical writing device according to claim 1, wherein the pressure exerted by the pressure unit on the cover unit is not less than 1N.

4. The optical writing device according to claim 1, wherein an area of the pressure unit exerting pressure on the cover unit is not more than 25 percent of an area of a surface of the cover unit contacting the pressure unit.

5. The optical writing device according to claim 2, wherein the pressure unit is disposed on a central axis of the cover unit.

6. The optical writing device according to claim 2, wherein the pressure unit is disposed on a rotation axis of the polygon mirror.

7. The optical writing device according to claim 2, wherein the pressure unit comprises a first cover and the cover unit comprises a second cover, the first cover covering the second cover.

8. The optical writing device according to claim 7, wherein the pressure unit comprises a protrusion configured to exert a pressure on the second cover.

9. The optical writing device according to claim 7, wherein the pressure unit comprises a curved surface configured to exert a pressure on the second cover.

10. The optical writing device according to claim 2, wherein the pressure unit comprises a pinched unit configured to be disposed between first and second covers of the cover unit.

11. The optical writing device according to claim 7, wherein the first and second covers comprise different noise insulating properties.

12. An optical writing device comprising:
a polygon mirror configured to guide a light beam emitted from a light source; and
a case in which the polygon mirror is disposed, the case comprising:
a housing surrounding the polygon mirror; and
a covering unit disposed on the housing, the covering unit comprising a first cover and a second cover including a protrusion, the second cover disposed on the first cover such that pressure is exerted by the protrusion on the first cover.

13. The optical writing device according to claim 12, wherein the protrusion is disposed on a central axis of the second cover.

14. The optical writing device according to claim 12, wherein the protrusion is disposed on a rotation axis of the polygon mirror.

15. An optical writing device comprising:
a polygon mirror configured to guide a light beam emitted from a light source; and
a case in which the polygon mirror is disposed, the case comprising:
a housing surrounding the polygon mirror; and
a covering unit disposed on the housing, the covering unit comprising a first cover and a second cover having a curved shape, the second cover disposed on the first cover such that pressure is exerted by the curved shape on the first cover.

16. The optical writing device according to claim 15, wherein a central axis of the curved shape is disposed on a central axis of the second cover.

17. The optical writing device according to claim 15, wherein the curved shape is disposed on a rotation axis of the polygon mirror.

18. An optical writing device comprising:
a polygon mirror configured to guide a light beam emitted from a light source; and
a case in which the polygon mirror is disposed, the polygon mirror comprising:
a housing surrounding the polygon mirror; and
a covering unit disposed on the housing, the covering unit comprising first and second covers and a pinched member, the pinched member disposed between the first and second covers such that pressure is exerted on the first cover.

19. The optical writing device according to claim 18, wherein the pinched member is disposed on a central axis of one of the first and second covers.

20. The optical writing device according to claim 18, wherein the pinched member is disposed on a rotation axis of the polygon mirror.

21. An optical writing device comprising:
means for guiding a light beam emitted from a light source; and
a case in which the means for guiding is disposed, the case comprising:
means for covering an opening of a housing surrounding the means for guiding; and
means for exerting pressure on the means for covering, wherein pressure exerted by the means for exerting pressure is greater than pressure exerted on another portion of the means for covering.

22. The optical writing device according to claim 21, wherein the case comprises means for housing the means for guiding therein, the means for covering closing an opening in the means for housing.

23. An optical writing device according to claim 21, wherein pressure exerted by the means for exerting pressure on the means for covering is not less than 1N.

24. The optical writing device according to claim 21, wherein an area of the means for exerting pressure is not more than 25 percent of an area of a surface of the means for covering that contacts the means for exerting pressure.

25. The optical writing device according to claim 22, wherein the means for exerting pressure is disposed on a central axis of the means for covering.

26. The optical writing device according to claim 22, wherein the means for exerting pressure is disposed on a rotation axis of the means for guiding.

27. The optical writing device according to claim 22, wherein the means for exerting pressure comprises a first cover and the means for covering comprises a second cover, the first cover covering the second cover.

28. An image forming apparatus comprising:
an image forming device comprising a photoconductor; and
the optical writing device according to claim 1.

29. A method of suppressing noise in an image forming apparatus, comprising:
disposing a first cover on a housing in which a polygon mirror is disposed; and
exerting a greater pressure against a middle portion of the first cover to retain the first cover on the housing than at another portion of the first cover.

30. The method according to claim 29, wherein a second cover includes a protrusion exerting pressure against the first cover.

31. The method according to claim 29, wherein a second cover includes a convex surface exerting pressure against the first cover.

32. The method according to claim 29, wherein an elastically deformable member exerts pressure against the first cover.

* * * * *